(12) United States Patent
Marin

(10) Patent No.: US 12,133,510 B2
(45) Date of Patent: Nov. 5, 2024

(54) COMPUTER CONTROLLED STRESS AND STRAIN GAUGE SENSOR

(71) Applicant: Mario J. Marin, Murrieta, CA (US)

(72) Inventor: Mario J. Marin, Murrieta, CA (US)

(*) Notice: Subject to any disclaimer, the term of this patent is extended or adjusted under 35 U.S.C. 154(b) by 279 days.

(21) Appl. No.: 17/874,261

(22) Filed: Jul. 26, 2022

(65) Prior Publication Data
US 2022/0354092 A1 Nov. 10, 2022

Related U.S. Application Data

(63) Continuation-in-part of application No. 16/271,805, filed on Feb. 9, 2019, now abandoned.

(51) Int. Cl.
| | | |
|---|---|---|
| *A01K 15/02* | (2006.01) | |
| *A01K 29/00* | (2006.01) | |
| *G01L 1/22* | (2006.01) | |
| *G01L 5/00* | (2006.01) | |
| *G01L 5/10* | (2020.01) | |
| *G01L 5/1627* | (2020.01) | |
| *G08B 5/36* | (2006.01) | |
| *G08B 21/18* | (2006.01) | |

(52) U.S. Cl.
CPC .......... *A01K 29/005* (2013.01); *A01K 15/021* (2013.01); *A01K 15/025* (2013.01); *G01L 1/22* (2013.01); *G01L 5/0033* (2013.01); *G01L 5/10* (2013.01); *G01L 5/1627* (2020.01); *G08B 5/36* (2013.01); *G08B 21/182* (2013.01)

(58) Field of Classification Search
CPC .. A01K 29/005; A01K 15/021; A01K 15/025; G01L 1/22; G01L 5/0033; G01L 5/10; G01L 5/1627; G08B 5/36; G08B 21/182
See application file for complete search history.

(56) References Cited

U.S. PATENT DOCUMENTS

| | | | |
|---|---|---|---|
| 8,402,924 B2* | 3/2013 | Pacheco | A01K 15/021 119/719 |
| 2003/0221633 A1* | 12/2003 | Werde | A01K 15/025 119/707 |
| 2004/0211369 A1* | 10/2004 | Wechsler | A01K 15/025 119/707 |
| 2007/0234969 A1* | 10/2007 | Lynch | A01K 15/02 119/707 |
| 2009/0007854 A1* | 1/2009 | Cooper | A01K 15/025 87/8 |

(Continued)

*Primary Examiner* — David J Bolduc
(74) *Attorney, Agent, or Firm* — Edmond DeFrank

(57) ABSTRACT

The embodiments disclose a stress and strain gauge including at least one stress and strain sensor module configured to sense stresses and strains being applied by an animal biting a rope extending from a protective hand guard, a stress and strain gauge indicator coupled to the at least one stress and strain sensor configured for measuring the sensed stresses and strains as strain levels, a processor coupled to the stress and strain gauge indicator configured to dynamically analyze and compare the strain levels to predetermined threshold strain level measurements to determine a current animal play level that varies incrementally, and an alert module wirelessly coupled to the processor configured to notify a user of the protective hand guard in real-time of the current incremental animal play level.

20 Claims, 15 Drawing Sheets

(56) References Cited

U.S. PATENT DOCUMENTS

| | | | |
|---|---|---|---|
| 2011/0120387 A1* | 5/2011 | Warkentin | A01K 27/005 |
| | | | 119/719 |
| 2012/0090556 A1* | 4/2012 | Rosa | A01K 15/026 |
| | | | 119/709 |
| 2012/0318209 A1* | 12/2012 | Christianson | A01K 15/025 |
| | | | 119/707 |
| 2017/0280794 A1* | 10/2017 | Parrish | A41D 19/01 |
| 2020/0253164 A1* | 8/2020 | Marin | A01K 15/025 |

* cited by examiner

COMPUTER CONTROLLED STRESS AND STRAIN GAUGE SENSOR

CROSS-REFERENCE TO RELATED APPLICATIONS

This patent application is a continuation-in-part application based on pending U.S. Non-Provisional application Ser. No. 16/271,805 filed Feb. 9, 2019, entitled "APPARATUS AND METHOD FOR A PET TOY HAND GUARD SYSTEM", by MARIO J. MARIN, the U.S. patent application being incorporated herein by reference.

BACKGROUND

Stress and strain gauges measure forces being exerted in a multitude of circumstances. Stress and strain gauge measurements provide the raw data needed to analyze the results the forces effect. An analysis of the stress and strain gauge measurements allows modifications to be determined if warranted to alter the results of the forces being applied.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the embodiments.

General Overview:

It should be noted that the descriptions that follow, for example, in terms of an apparatus and method for a pet toy hand guard system is described for illustrative purposes and the underlying system can apply to any number and multiple types an apparatus and method for a pet toy hand guard system. In one embodiment of the present invention, the pet toy hand guard can be configured using a plastic, other material that is sturdy, safe for dogs/animals and humans, or metal fabrication material. The apparatus and method for a pet toy hand guard system can be configured to include at least one rope pet toy and can be configured to include other types of tugging pet toys using the embodiments.

Figure 1:
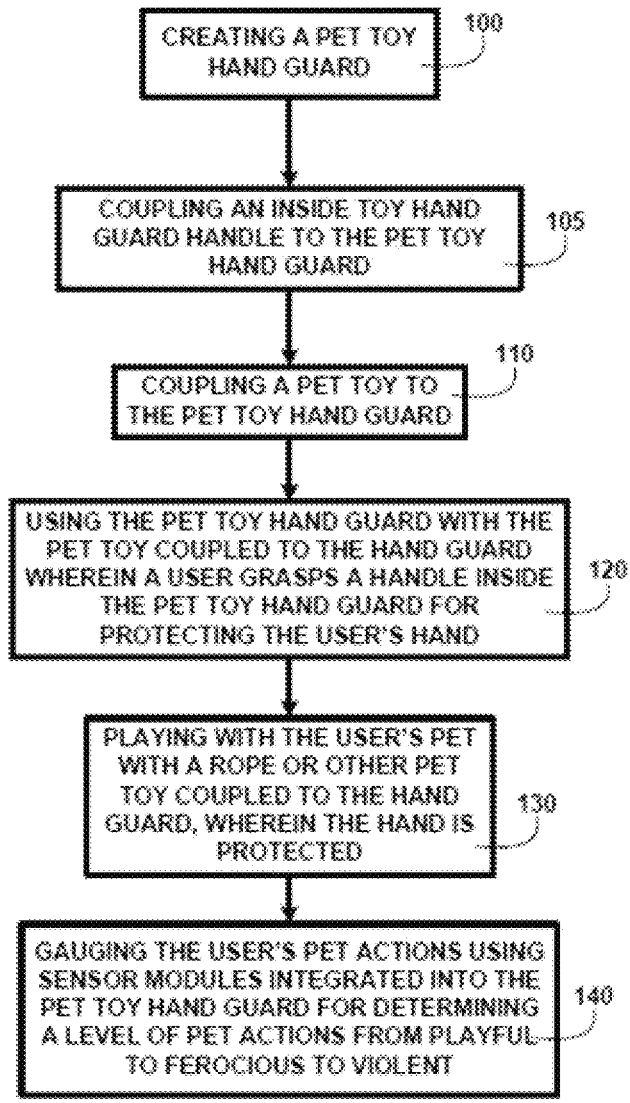
FIG. 1 shows a block diagram of an overview of an apparatus and method for a pet toy hand guard system of one embodiment.

FIG. 1 shows a block diagram of an overview of an apparatus and method for a pet toy hand guard system of one embodiment. FIG. 1 shows the apparatus and method for a pet toy hand guard system including creating a pet toy hand guard 100. The creating a pet toy hand guard 100 can include fabricating the pet toy hand guard using a durable plastic or metal material. Coupling an inside toy hand guard handle to the pet toy hand guard 105 for allowing a user to grasp the inside pet toy hand guard handle for securing a firm grip on the pet toy hand guard. Coupling a pet toy to the pet toy hand guard 110 provides a pet owner and handler with an apparatus for tugging play with their pet. Using the pet toy hand guard with the pet toy coupled to the hand guard wherein a user grasps a pet toy hand guard handle inside the pet toy hand guard for protecting the user's hand 120. The inside pet toy hand guard handle will also allow for a better grip of a pet toy while playing with pet and keep or minimize any type of injury to hand, palm, and fingers. The pet toy hand guard will encapsulate and protect the hand from a potential/accidental bite while playing with your pet. Playing with the user's pet with a rope or other pet toy coupled to the hand guard, wherein the hand is protected 130. Gauging the user's pet actions using sensor modules integrated into the pet toy hand guard for determining a level of pet actions from playful to ferocious to violent 140. A pet's actions may change characteristics if they are sick or suffering from a condition. Gauging the user's pet actions may provide the pet owner with an indication that their pet may be sick or suffering from a condition and may also alert the pet owner that the pet is more aggressive or violent than the pet owner was aware of and may need to seek advice from a veterinarian or trainer of one embodiment.

DETAILED DESCRIPTION

Figure 2:
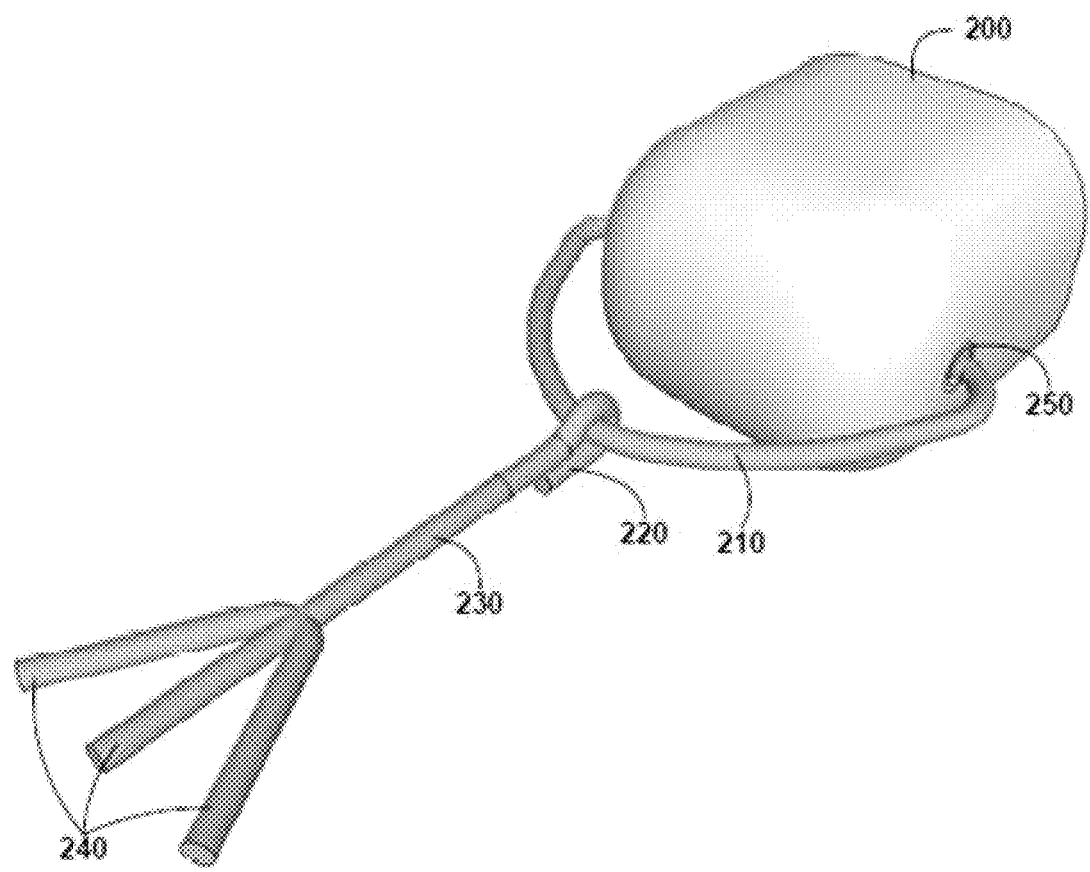
FIG. 2 shows for illustrative purposes only an example of a first pet toy hand guard system coupled with a first pet toy of one embodiment.

FIG. 2 shows for illustrative purposes only an example of a first pet toy hand guard system coupled with a first pet toy of one embodiment. FIG. 2 shows a pet toy hand guard 200 with a coupled pet toy attachment rope 210. The pet toy attachment rope 210 is coupled to the pet toy hand guard 200 through a pet toy hand guard handle opening 250. A pet toy coupling device 220 is used to couple a pet toy extension 230 with a 3-section pet toy 240 to the pet toy attachment rope 210. The user's pet can bite a pet toy including the 3-section pet toy 240 and tug the 3-section pet toy 240 away from the pet toy hand guard 200 and from side to side of one embodiment.

Figure 3:
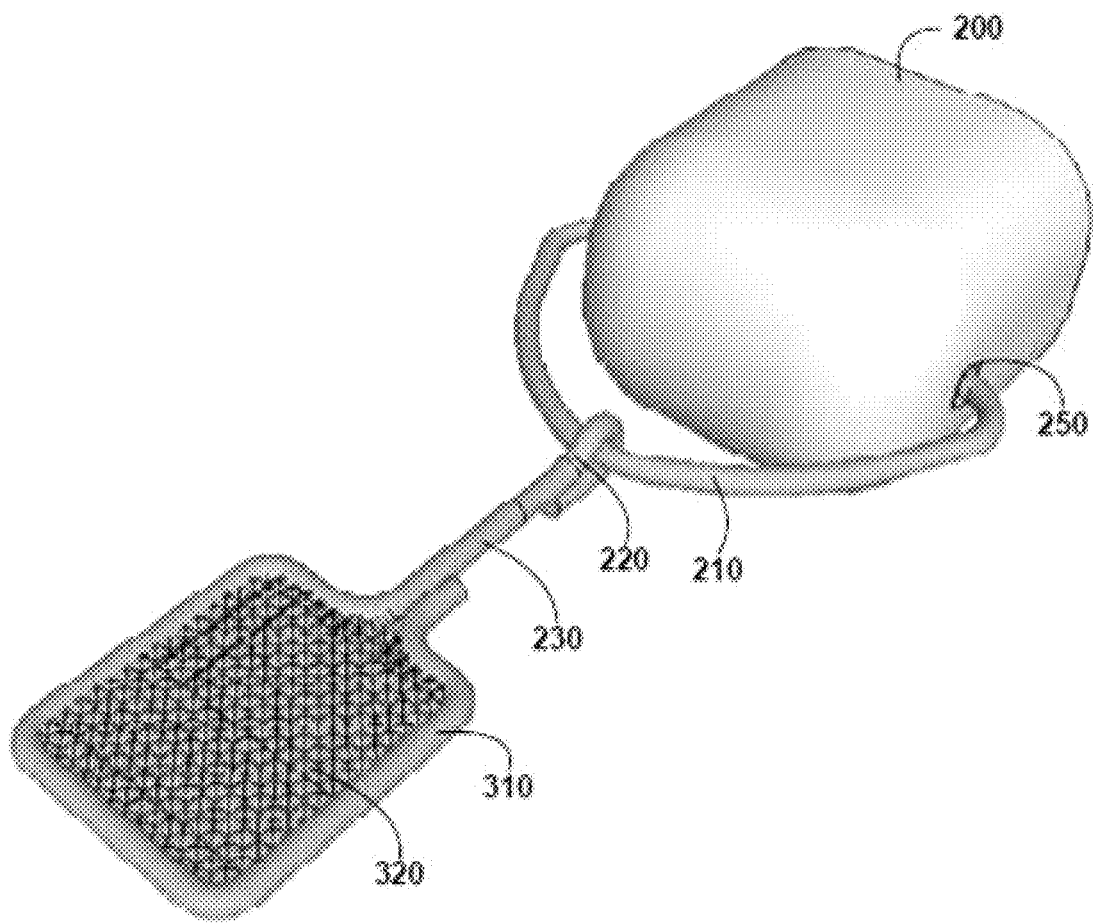
FIG. 3 shows for illustrative purposes only an example of a first pet toy hand guard system with a second pet toy of one embodiment.

A First Pet Toy Hand Guard System with a Second Pet Toy:

FIG. 3 shows for illustrative purposes only an example of a first pet toy hand guard system with a second pet toy of one embodiment. FIG. 3 shows a pet toy hand guard 200 with a coupled pet toy attachment rope 210. The pet toy attachment rope 210 is coupled to the pet toy hand guard 200 through a pet toy hand guard handle opening 250. A pet toy coupling device 220 is used to couple a pet toy extension 230 with a rectangular bite frame 310 with a rectangular bite frame mesh 320 to the pet toy attachment rope 210 of one embodiment.

Figure 4:
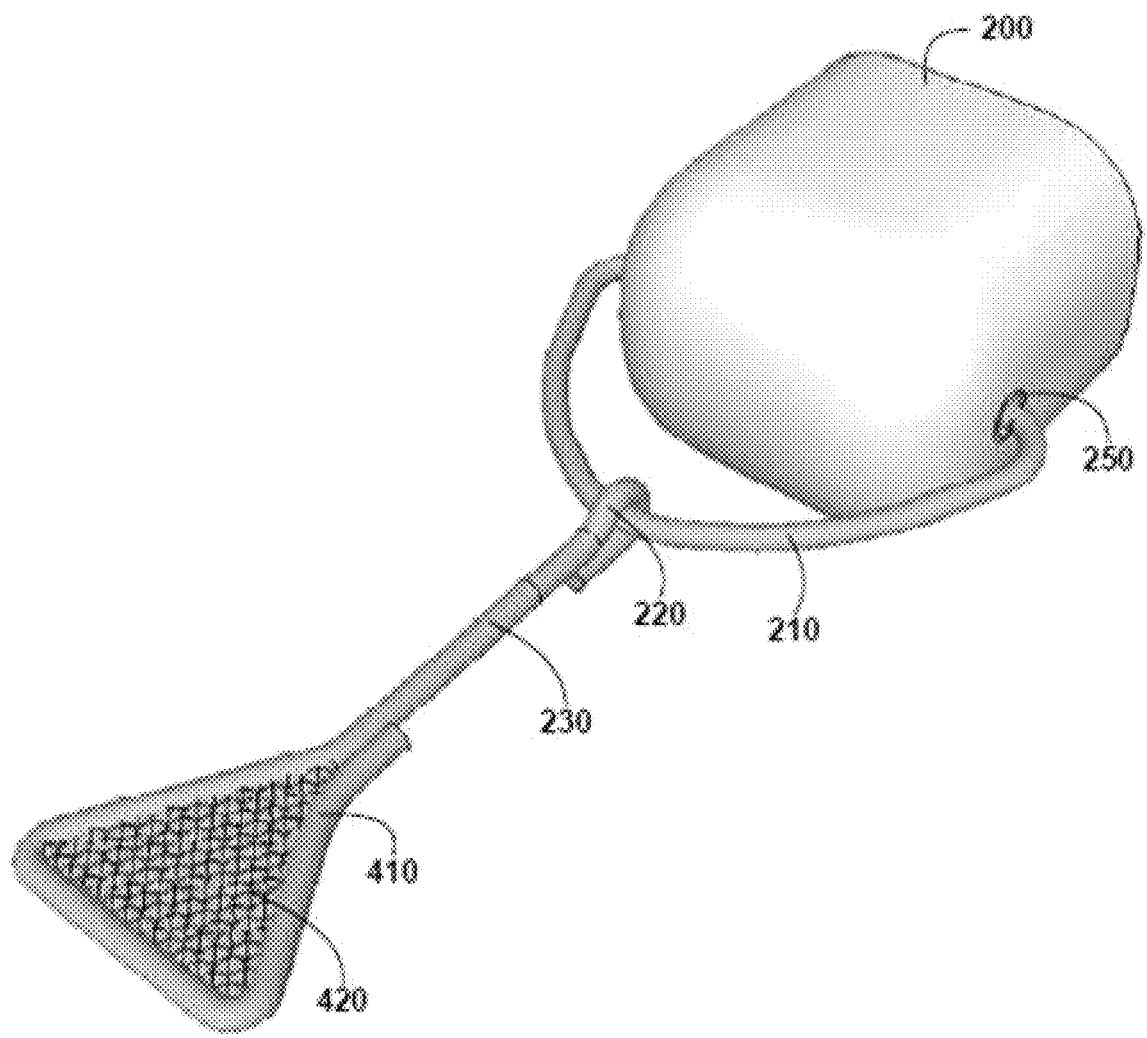
FIG. 4 shows for illustrative purposes only an example of a first pet toy hand guard system with a third pet toy of one embodiment.

A Pet Toy Hand Guard System with a Third Pet Toy:

FIG. 4 shows for illustrative purposes only an example of a first pet toy hand guard system with a third pet toy of one embodiment. FIG. 4 shows a pet toy hand guard 200 with a coupled pet toy attachment rope 210. The pet toy attachment rope 210 is coupled to the pet toy hand guard 200 through a pet toy hand guard handle opening 250. A pet toy coupling device 220 is used to couple a pet toy extension 230 with a triangular bite frame 410 with a triangular bite frame mesh 420 to the pet toy attachment rope 210 of one embodiment.

Figure 5:
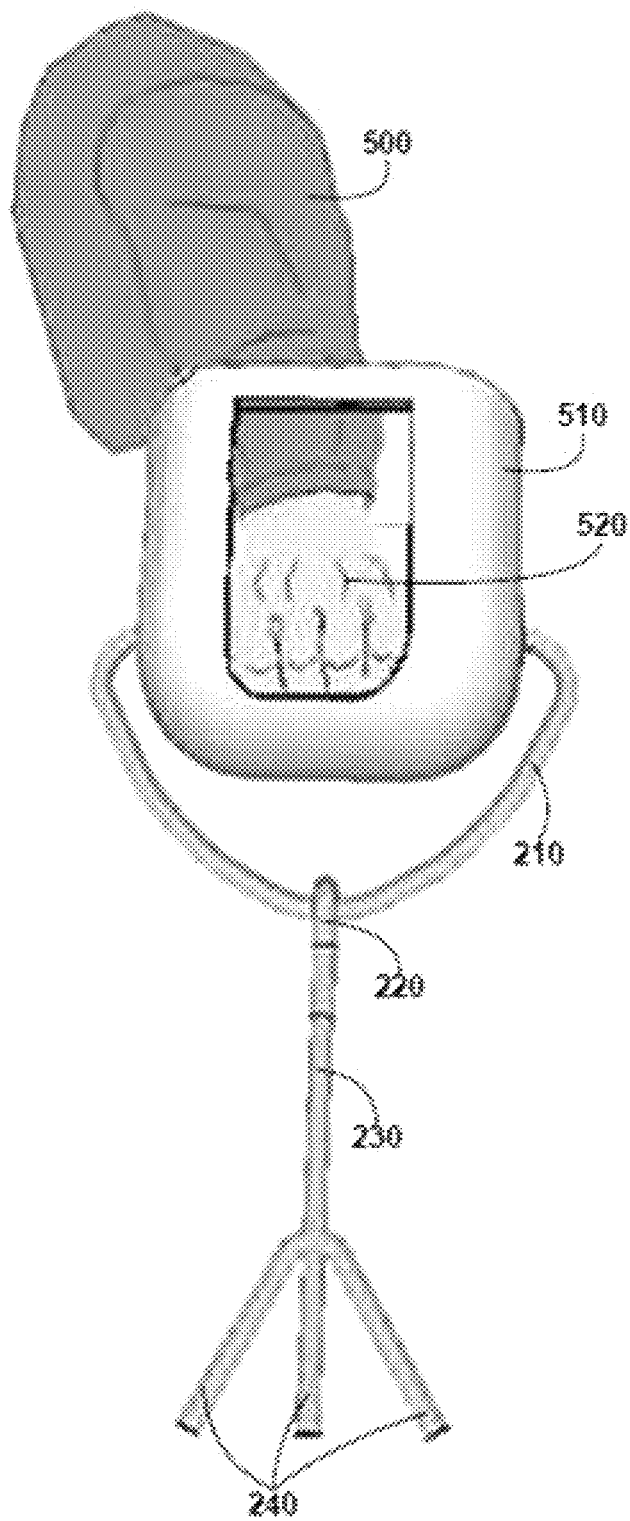
FIG. 5 shows for illustrative purposes only an example of a user hand holding the first pet toy hand guard with the first pet toy cutaway top view of one embodiment.

A User Hand Holding the First Pet Toy Hand Guard with the First Pet Toy Cutaway Top View:

FIG. 5 shows for illustrative purposes only an example of a user hand holding the first pet toy hand guard with the first pet toy cutaway top view of one embodiment. FIG. 5 shows the pet toy attachment rope 210, pet toy coupling device 220, pet toy extension 230, and the 3-section pet toy 240 coupled to the pet toy hand guard with a top cut away for illustration purposes 510. A pet owner's arm 500 is shown extending a pet owner's hand inside the pet toy hand guard 200. Showing inside the pet toy hand guard 200 a pet owner's hand grasping a pet toy hand guard handle 520 of one embodiment.

Figure 6:
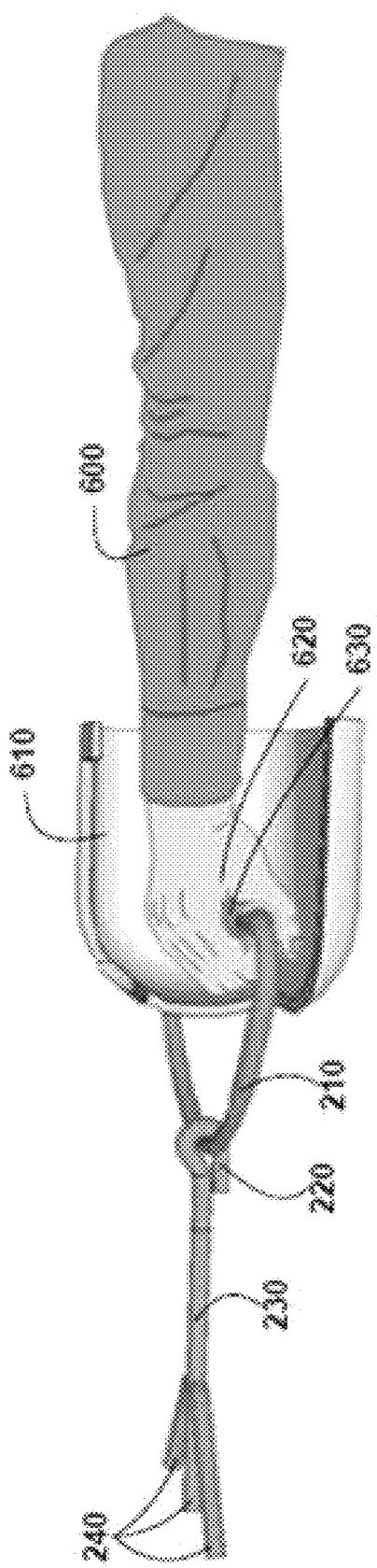
FIG. 6 shows for illustrative purposes only an example of a user hand holding the first pet toy hand guard with the first pet toy cutaway side view of one embodiment.

A User Pet Playing with the First Pet Toy Cutaway Side View:

FIG. 6 shows for illustrative purposes only an example of a user hand holding the first pet toy hand guard with the first pet toy cutaway side view of one embodiment. FIG. 6 shows the pet toy attachment rope 210, pet toy coupling device 220, pet toy extension 230, the 3-section pet toy 240, and a pet toy hand guard handle 630. FIG. 6 also shows a side view of the pet toy hand guard with a side view cut away for illustration purposes 610 and a side view of the pet owner's arm extending into the pet toy hand guard 600 up to the wrist. A pet owner's hand grasping the pet toy hand guard handle 620 shows how a pet owner can firmly control the pet toy hand guard 200 of FIG. 2 of one embodiment.

Figure 7:
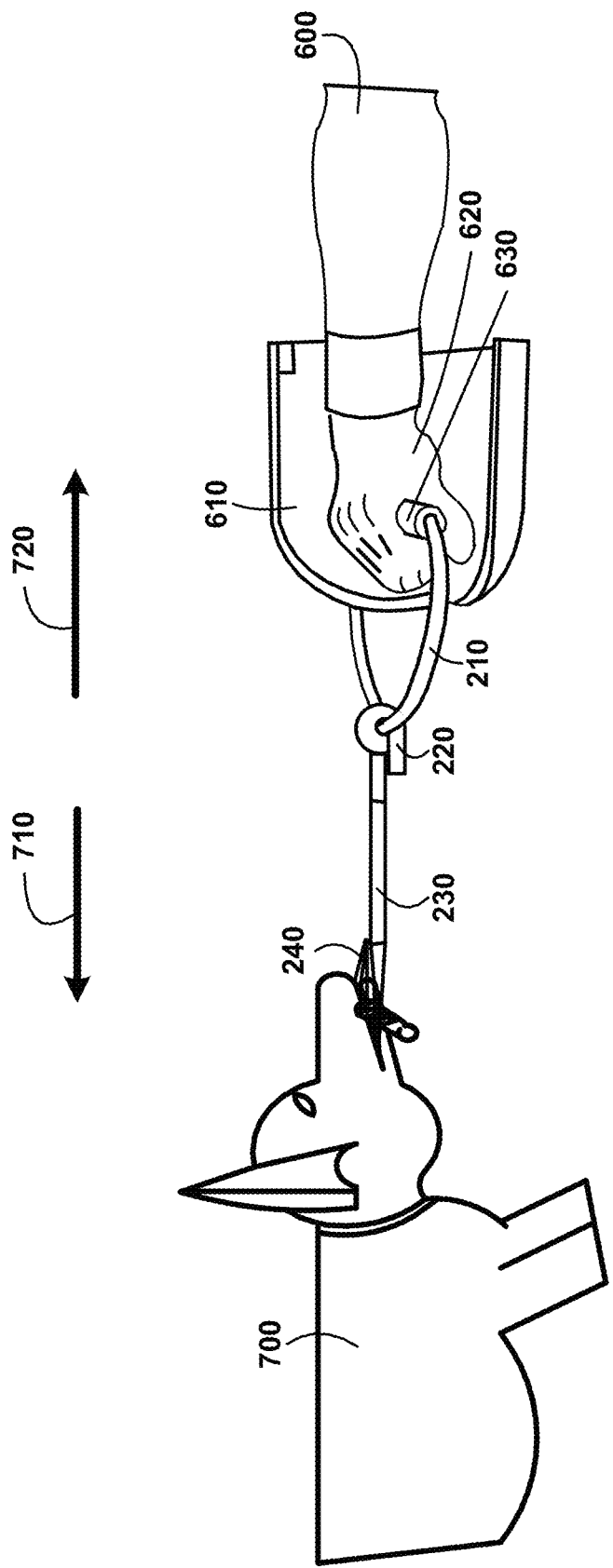
FIG. 7 shows for illustrative purposes only an example of a user pet playing with the first pet toy cutaway side view of one embodiment.

A First Pet Toy Hand Guard System Interior View:

FIG. 7 shows for illustrative purposes only an example of a user pet playing with the first pet toy cutaway side view of one embodiment. FIG. 7 shows the pet toy attachment rope 210, pet toy coupling device 220, pet toy extension 230, the 3-section pet toy 240, and the pet toy hand guard handle 630. The a side view of the pet toy hand guard with a side view cut away for illustration purposes 610 shows the side view of the pet owner's arm extending into the pet toy hand guard 600 and the pet owner's hand grasping the pet toy hand guard handle 620. A pet owner's pet in this example a dog is biting the 3 section pet toy 700 and wherein the dog is pulling the 3 section pet toy towards itself 710 and the pet owner is pulling in the opposite direction 720 of one embodiment.

Figure 8:
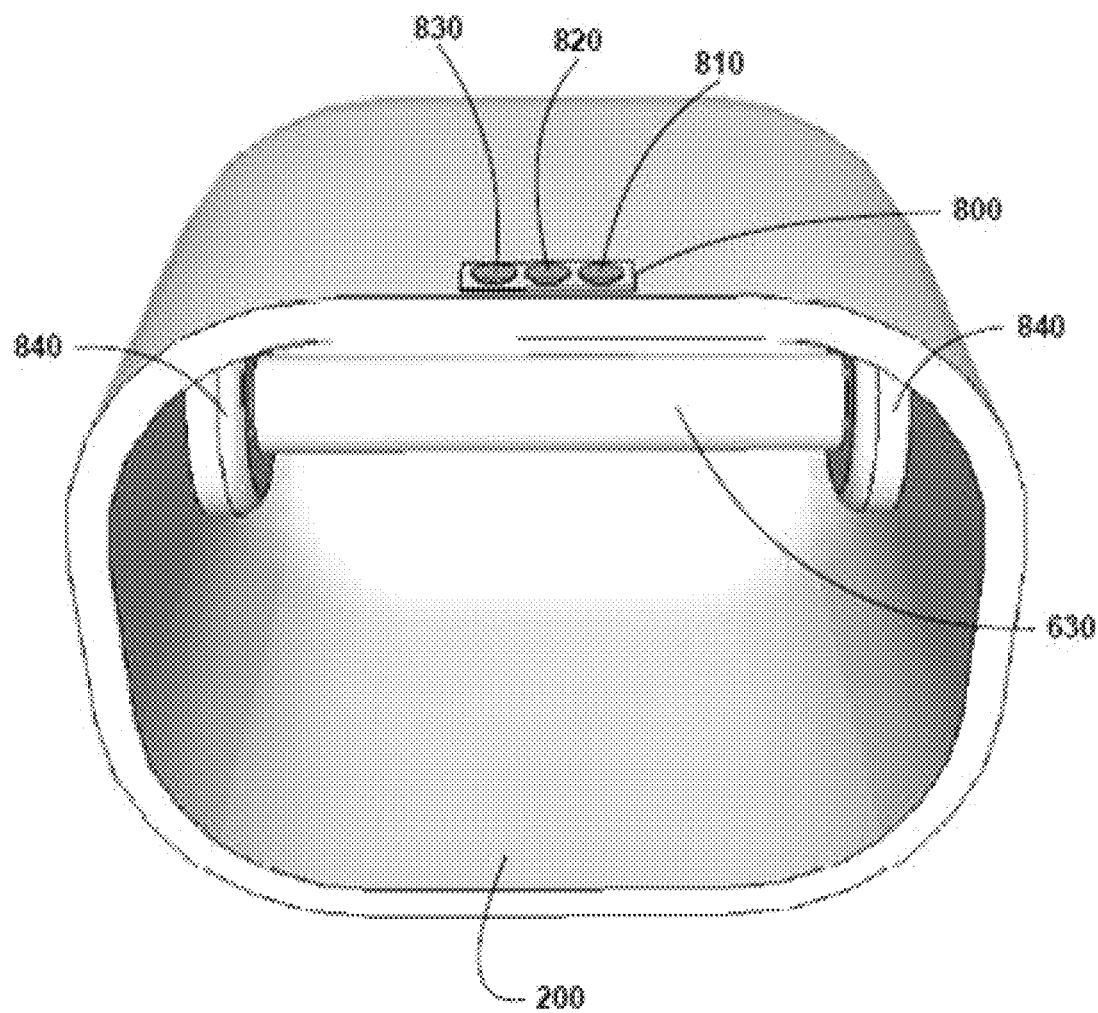
FIG. 8 shows for illustrative purposes only an example of a first pet toy hand guard system interior view of one embodiment.

Pet Action Integrated Sensors Modules:

FIG. 8 shows for illustrative purposes only an example of a first pet toy hand guard system interior view of one embodiment. FIG. 8 shows the pet toy hand guard 200 coupled with the pet toy hand guard handle 630 are configured for ambidextrous use. At least one integrated sensor module 800 compartment coupled to the pet toy hand guard 200 is also electronically and mechanically coupled to the pet toy hand guard handle 630. A pet pulling and thrashing from side to side with the pet toy activates the at least one integrated sensor module 800. The at least one integrated sensor module 800 is configured to measure the pulling force and thrashing magnitude of force and frequency.

The at least one integrated sensor module 800 includes in the compartment at least one rechargeable battery, a digital processor, a digital memory device and a near-field transceiver with a WIFI connection capable communication device. The at least one integrated sensor module 800 compartment includes a playful sensing gauge LED light 810, a ferocious sensing gauge LED light 820, and a violent sensing gauge LED light 830 to alert the pet owner of the pet action level. A pet toy hand guard handle reinforcing module 840 with at least one stress sensor module configured for determine an amount of stress being applied on the pet toy hand guard of one embodiment.

Figure 9:
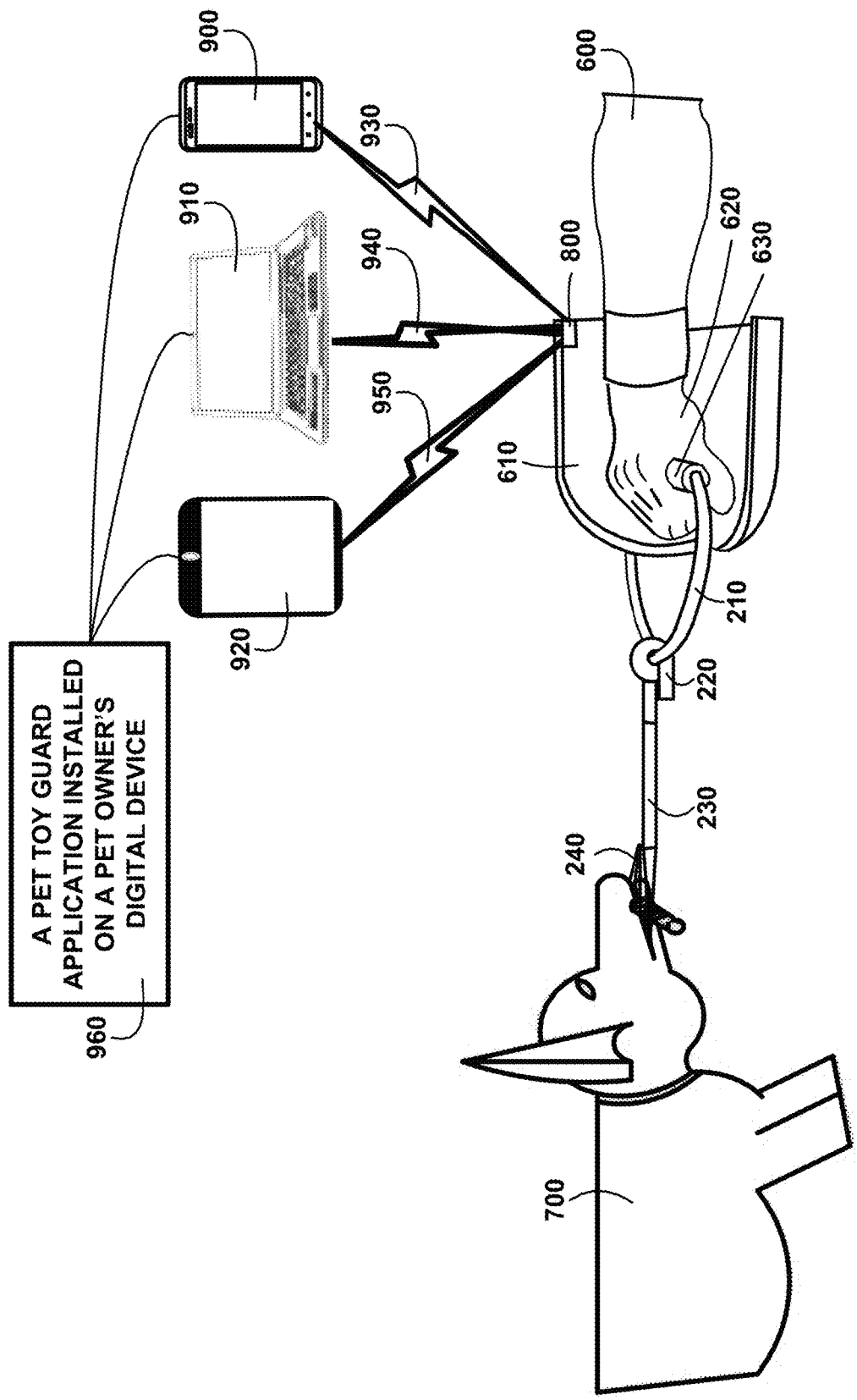
FIG. 9 shows for illustrative purposes only an example of pet action integrated sensors modules of one embodiment.

A First Pet Toy Hand Guard Side View:

FIG. 9 shows for illustrative purposes only an example of pet action integrated sensors modules of one embodiment. FIG. 9 shows the side view of the pet toy hand guard with a side view cut away for illustration purposes 610. FIG. 9 also shows the pet toy attachment rope 210, pet toy coupling device 220, pet toy extension 230 and the 3-section pet toy 240. FIG. 9 shows a side view of the pet owner's arm extending into the pet toy hand guard 600 to a pet toy hand guard handle 630 and with a pet owner's hand grasping the pet toy hand guard handle 620. A pet owner's pet in this example is a dog biting and pulling on the 3 section pet toy 700. An integrated sensor module compartment coupled to pet toy hand guard handle 800 illuminate an LED light which can indicate a playful, ferocious or violent level of play from the pet.

A pet toy hand guard application installed on a pet owner's digital device 960 can receive from the at least one integrated sensor module 800, near-field transceiver, a WIFI connection capable communication device, a play level alert, and a graphic and numeric determined strain level indicator. A pet toy hand guard application installed on a pet owner's digital device 960, wherein the sensor gauging signal is received using the WIFI connectivity of the pet owner's digital device and displayed using the pet toy hand guard application including an audible alert differing for each pet action level determined. The pet toy hand guard application play level display on for example a pet owner's smart phone 900 can be forwarded to for example a dog trainer or veterinarian for advice to the pet owner on behavioral training methods.

A sensor gauging signal can be transmitted to the pet owner's smart phone 930, a pet owner's computer including a desktop and laptop computer 910 and a pet owner's digital tablet 920. A pet owner may elect to record and store each pet action level determined on for example the pet owner's computer 940 or the pet owner's digital tablet 950 to review the progression of training using the pet toy hand guard 200 of one embodiment.

Figure 10:
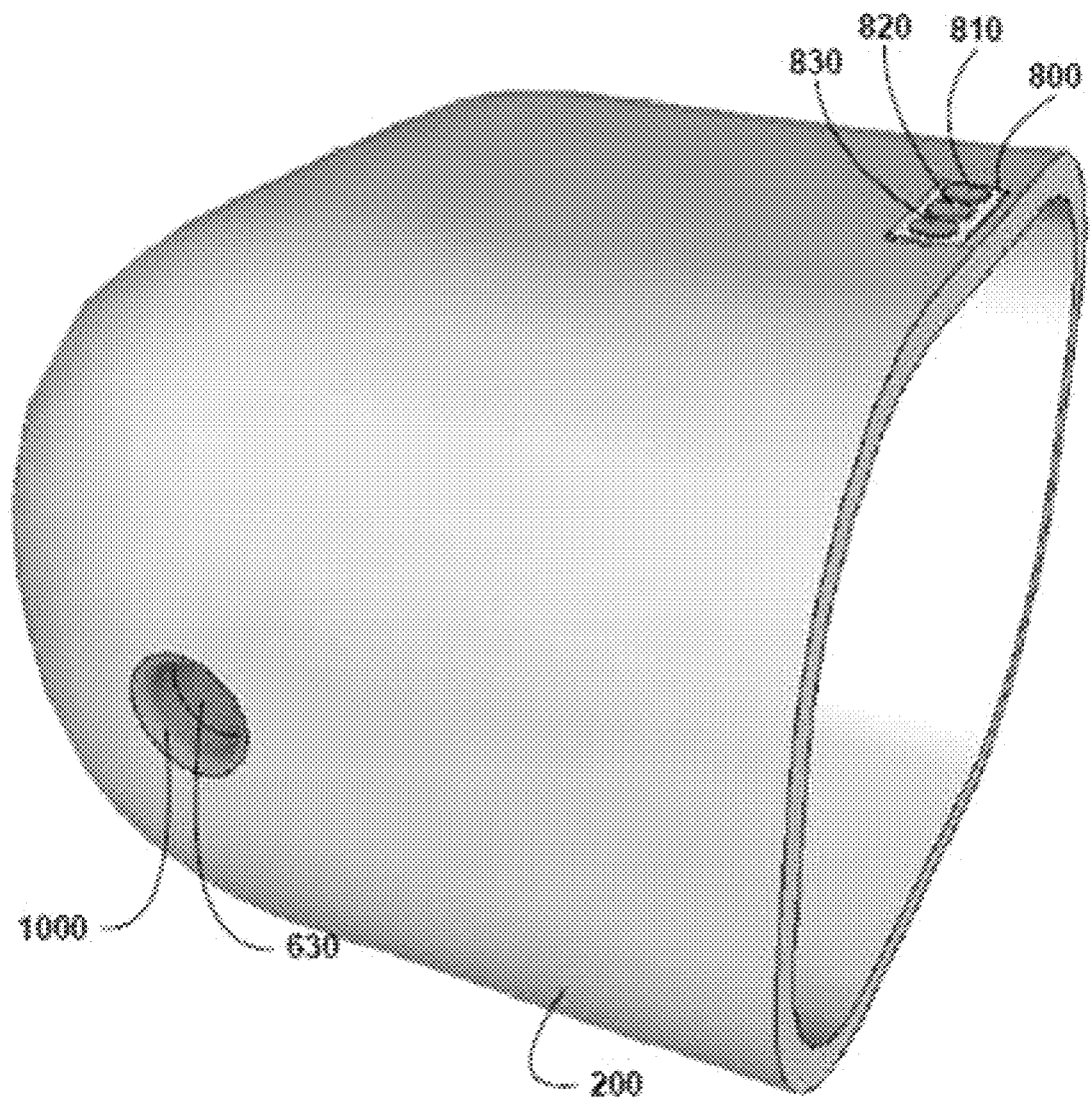
FIG. 10 shows for illustrative purposes only an example of a first pet toy hand guard rear perspective view of one embodiment.

A First Pet Toy Hand Guard Rear Perspective View:

FIG. 10 shows for illustrative purposes only an example of a first pet toy hand guard rear perspective view of one embodiment. FIG. 10 shows a pet toy hand guard 200 with an integrated sensor module compartment coupled to pet toy hand guard handle 800. The integrated sensor module compartment includes the playful sensing gauge LED light 810, ferocious sensing gauge LED light 820 and violent sensing gauge LED light 830. The pet toy hand guard handle 630 includes a pet toy hand guard handle terminus natural curve 1000 at both ends which also allows pulling of the rope to pass through tube without cutting or abrasion of one embodiment.

Figure 11A:
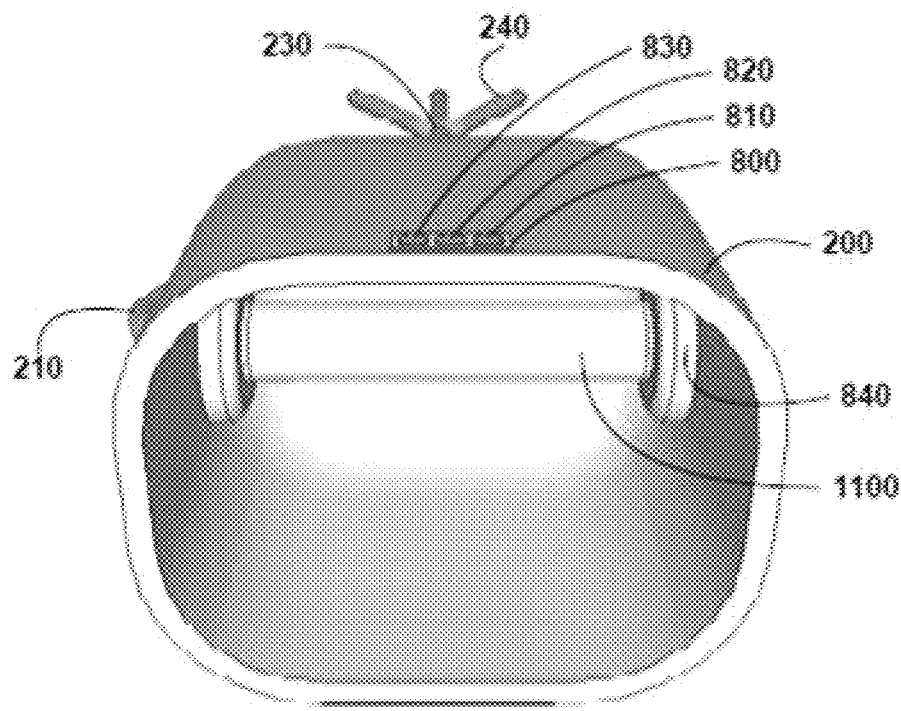
FIG. 11A shows for illustrative purposes only an example of a second pet toy hand guard system interior view of one embodiment.

Second Pet Toy Hand Guard System Interior View:

FIG. 11A shows for illustrative purposes only an example of a second pet toy hand guard system interior view of one embodiment. FIG. 11A shows the pet toy hand guard 200, pet toy attachment rope 210, pet toy extension 230, and 3 section pet toy 240. FIG. 11A further shows the integrated sensor module compartment coupled to pet toy hand guard handle 800 with the playful sensing gauge led light 810, ferocious sensing gauge led light 820, and violent sensing gauge led light 830. Seen in the interior view is the pet toy hand guard handle reinforcing module 840 with at least one stress sensor module configured for determine an amount of stress being applied on the pet toy hand guard of a second pet toy hand guard system 1100 of one embodiment.

Figure 11B:
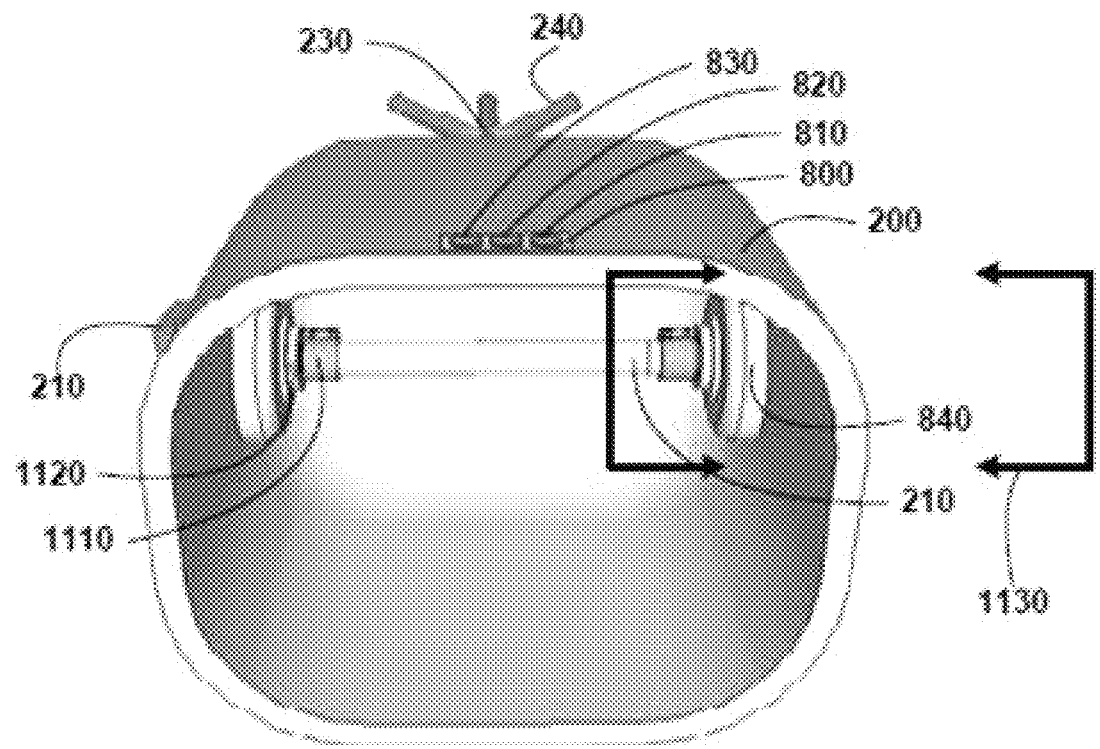
FIG. 11B shows for illustrative purposes only an example of a strain gauge sensor system interior view of one embodiment.

Strain Gauge Sensor System Interior View:

FIG. 11B shows for illustrative purposes only an example of a strain gauge sensor system interior view of one embodiment. FIG. 11B shows the pet toy hand guard 200, pet toy attachment rope 210, pet toy extension 230, 3 section pet toy 240, integrated sensor module compartment coupled to pet toy hand guard handle 800, playful sensing gauge led light 810, ferocious sensing gauge led light 820, violent sensing gauge led light 830, and the pet toy hand guard handle reinforcing module 840 with at least one stress sensor module configured for determine an amount of stress being applied on the pet toy hand guard. The interior view has the pet toy hand guard handle not shown to illustrate a strain gauge sensor rope gripper 1110 and sensor housing 1120 coupled to both ends of the pet toy hand guard handle and a cross section indicator 1130 of one embodiment.

Figure 12:
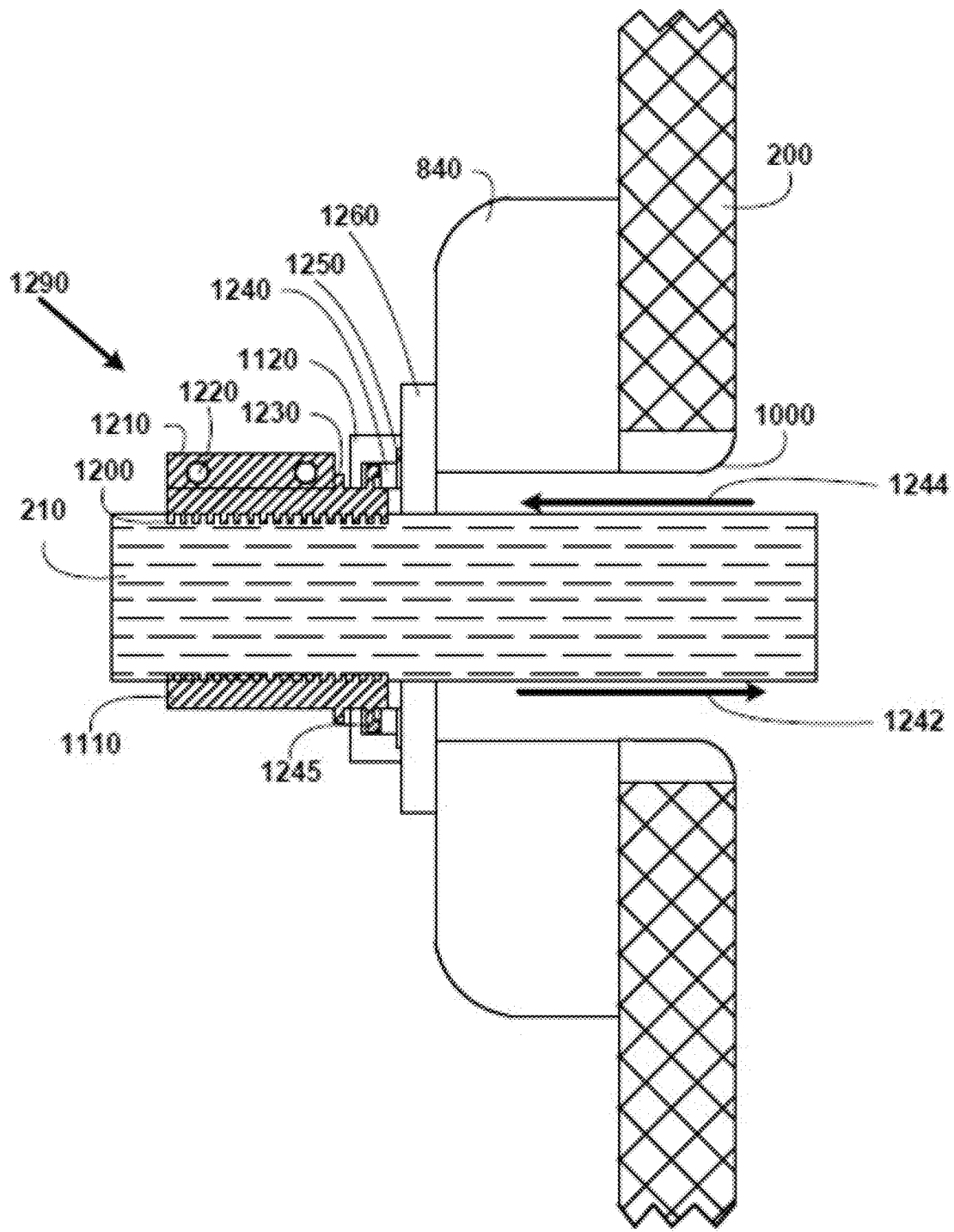
FIG. 12 shows for illustrative purposes only an example of a strain gauge sensor system cross section of one embodiment.

Strain Gauge Sensor System Cross Section:

FIG. 12 shows for illustrative purposes only an example of a strain gauge sensor system cross section of one embodiment. FIG. 12 shows a strain gauge sensor system cross section 1290 showing the pet toy hand guard 200, pet toy attachment rope 210, pet toy hand guard handle terminus natural curve 1000, and pet toy hand guard handle reinforcing module 840 with at least one stress sensor module configured for determine an amount of stress being applied on the pet toy hand guard. The strain gauge sensor rope gripper 1110 is shown coupled to the pet toy attachment rope 210 using strain gauge sensor rope gripper ribs 1200 to prevent slippage through the strain gauge. A strain gauge sensor rope gripper bracket 1210 allows tightening of the gripper and two strain gauge sensor rope gripper bracket bolt holes 1220 accept bolts to perform the tightening. A strain gauge sensor rope gripper stop 1230 is used to stop to prevent the stain gauge from being pulled out of the pet toy hand guard. The sensor housing 1120 contains at least one strain gauge sensor 1240 which is held in place using a sensor housing cover 1250.

A strain gauge mounting plate 1260 is used to mount the strain gauge assembly to the pet toy hand guard handle reinforcing module 840. A strain gauge press ring 1245 applies pressure to the at least one strain gauge sensor 1240 when the pet pulling rope is pull outward 1242. The strain gauge press ring 1245 releases pressure to the at least one strain gauge sensor 1240 when the pet pulling rope is pulled inward from the other side 1244. A pet side to side head thrashing creates strain that alternates the strain from one side to another. A pet pulling straight back from pet toy hand guard creates strain on both sides of one embodiment.

Figure 13:
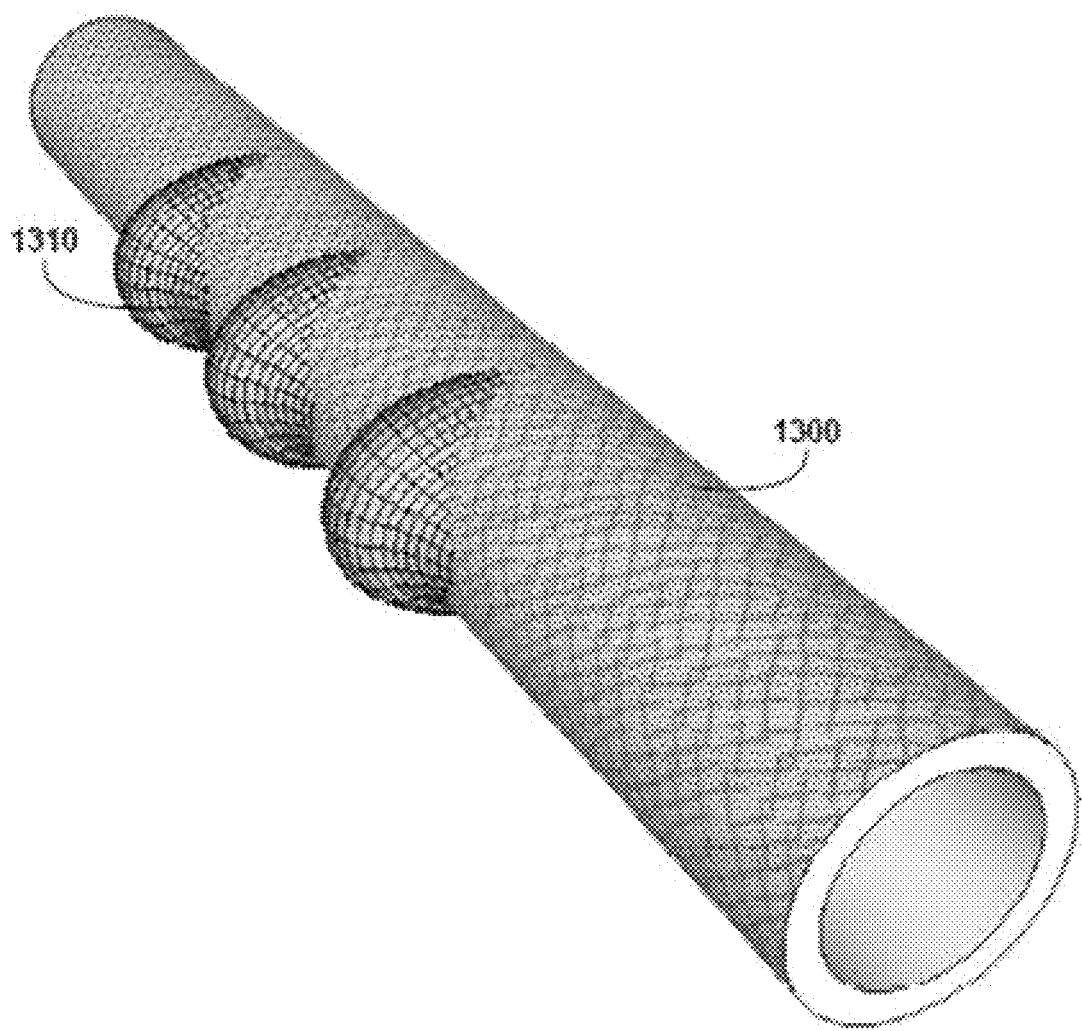
FIG. 13 shows for illustrative purposes only an example of a textured finger grip pet toy hand guard handle of one embodiment.

A Textured Finger Grip Pet Toy Hand Guard Handle:

FIG. 13 shows for illustrative purposes only an example of a textured finger grip pet toy hand guard handle of one embodiment. FIG. 13 shows a textured finger grip pet toy hand guard handle 1300 with a plurality of an integrated raised finger grip 1310. The textured surface of the textured finger grip pet toy hand guard handle 1300 and each integrated raised finger grip 1310 assist the user in maintaining a firm grip on the pet toy hand guard handle 630 of FIG. 6. The textured finger grip pet toy hand guard handle 1300 and pet toy hand guard handle 630 of FIG. 6 referred to here as an inside pet toy hand guard handle will also allow for better grip of the pet toy hand guard apparatus while playing with pet and keep or minimizing any type of injury to hand, palm, and fingers. The pet toy hand guard will encapsulate and protect the hand from a potential/accidental bite while playing with your pet of one embodiment.

Figure 14:
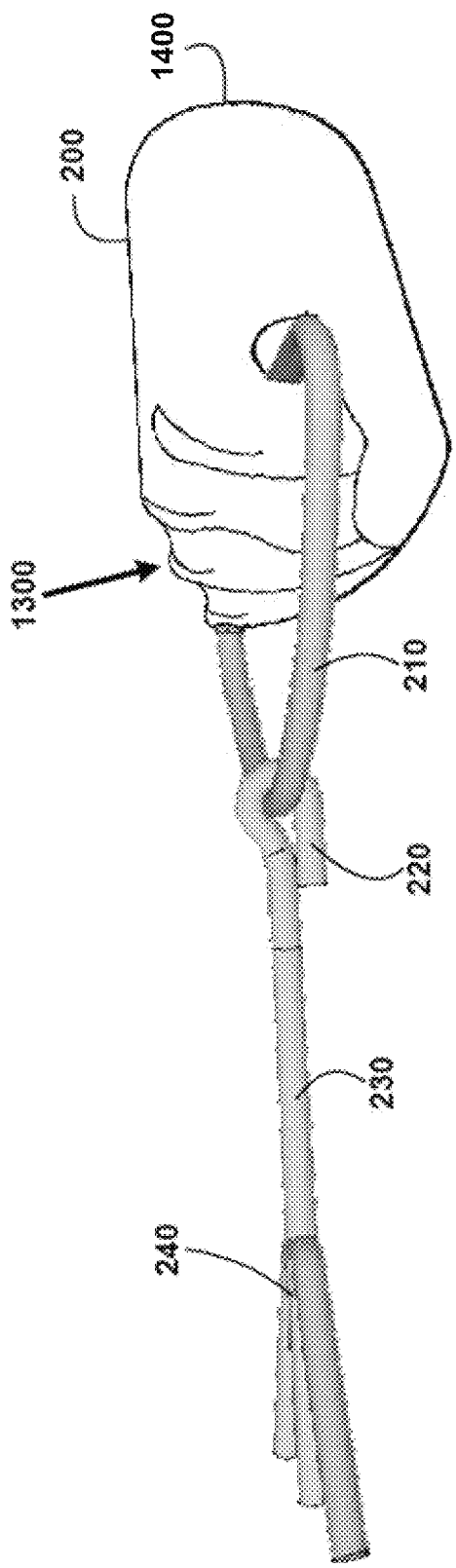
FIG. 14 shows for illustrative purposes only an example of human hand styled pet toy hand guard of one embodiment.

Human Hand Styled Pet Toy Hand Guard:

FIG. 14 shows for illustrative purposes only an example of human hand styled pet toy hand guard of one embodiment. FIG. 14 shows a pet toy hand guard 200 with the pet toy attachment rope 210, pet toy coupling device 220, pet toy extension 230, and 3 section pet toy 240 coupled to the pet toy hand guard 200. The pet toy hand guard 200 in one embodiment can be molded to create a human hand styled pet toy hand guard 1400. The human hand styled pet toy hand guard 1300 includes the pet toy hand guard handle opening 250 and is used by the user inserting a hand and grasping the pet toy hand guard handle 520 of FIG. 5 including the textured finger grip pet toy hand guard handle 1300 of FIG. 13. The human hand styled pet toy hand guard 1400 provides reinforcement to the training of don't bite the hand that feeds you of one embodiment.

Figure 15:
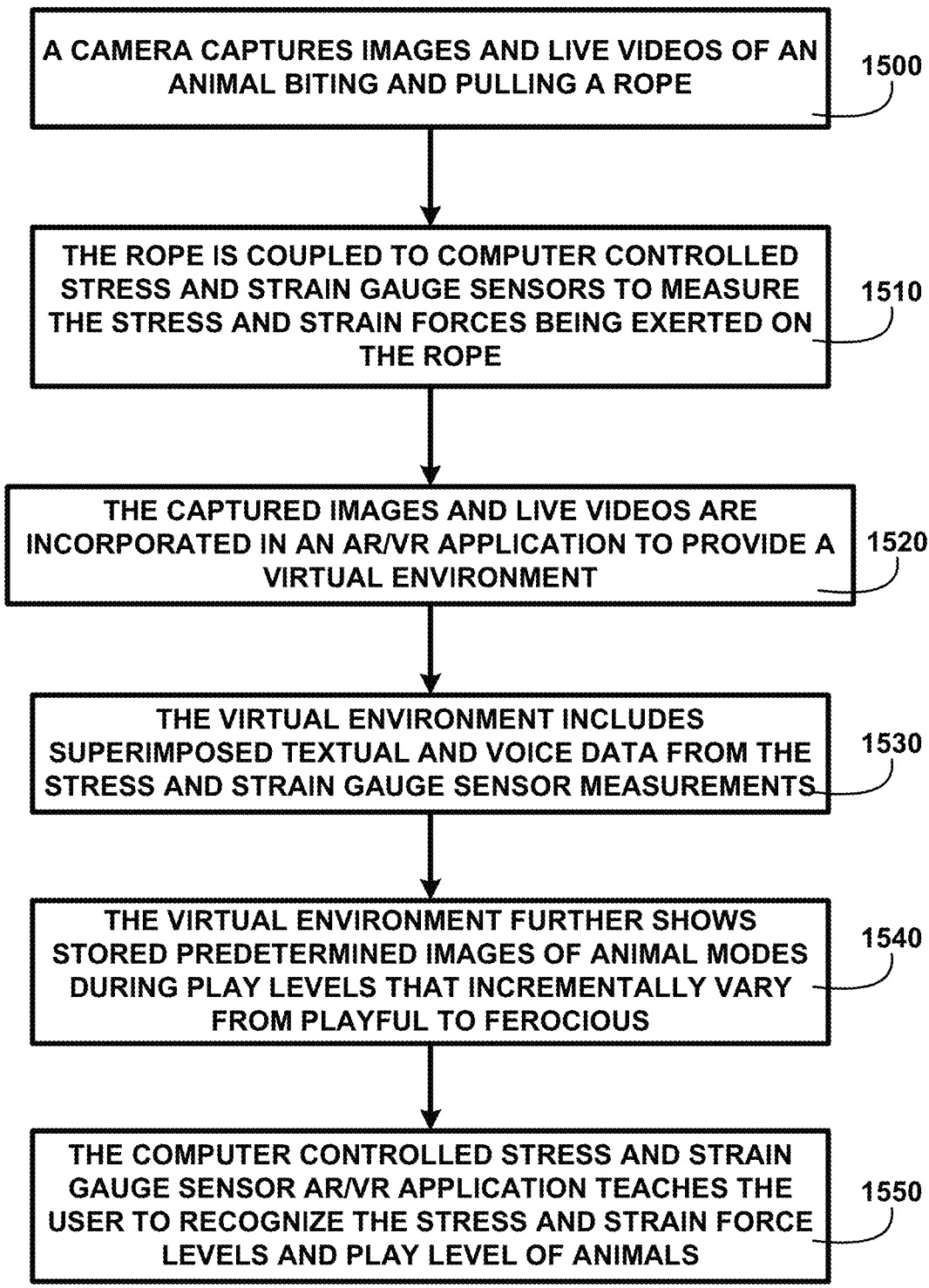
FIG. 15 shows a block diagram of an overview of a computer controlled stress and strain gauge sensor with an AR/VR application of one embodiment.

Computer Controlled Stress and Strain Gauge Sensor with an AR/VR Application:

FIG. 15 shows a block diagram of an overview of a computer controlled stress and strain gauge sensor with an AR/VR application of one embodiment. FIG. 15 shows a camera captures images and live videos of an animal biting and pulling a rope 1500. The rope is coupled to computer controlled stress and strain gauge sensors to measure the stress and strain forces being exerted on the rope 1510. The captured images and live videos are incorporated in an AR/VR application to provide a virtual environment 1520. The virtual environment includes superimposed textual and voice data from the stress and strain gauge sensor measurements 1530. The virtual environment further shows stored predetermined images of animal modes during play levels that incrementally vary from playful to ferocious 1540. The computer controlled stress and strain gauge sensor AR/VR application teaches the user to recognize the stress and strain force levels and play level of animals 1550 of the embodiment.

The virtual reality experience familiarizes the user with the use of the computer controlled stress and strain gauge sensor operations. The fully digital experience simulates the real world application of the system. The user is given the opportunity to see a real world differential between the animal play levels. The displayed instructions and explanations of the measured strain levels provides a clear understanding of the analysis of the stress and strain measured strain levels of one embodiment.

The foregoing has described the principles, embodiments and modes of operation of the embodiments. However, the embodiments should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

What is claimed is:

1. A stress and strain gauge, comprising:
   at least one stress and strain sensor module configured to sense stresses and strains being applied by an animal biting a rope extending from a protective hand guard;
   a stress and strain gauge indicator coupled to the at least one stress and strain sensor configured for measuring the sensed stresses and strains as strain levels;
   a processor coupled to the stress and strain gauge indicator configured to dynamically analyze and compare the strain levels to predetermined threshold strain level measurements to determine a current animal play level that varies incrementally; and
   an alert module wirelessly coupled to the processor configured to notify a user of the protective hand guard in real-time of the current incremental animal play level.

2. The stress and strain gauge of claim 1, wherein the alert module is wirelessly coupled to a mobile application and configured to display the sensed stresses and strains measurements in a graphic and numeric format.

3. The stress and strain gauge of claim 1, wherein the protective hand guard includes an illuminator with a series of light emitting diode (LED) lights coupled to the alert module and configured to illuminate the LED lights incrementally in real-time based on the current determined animal play level.

4. The stress and strain gauge of claim 1, wherein the strain level includes a magnitude of thrashing force configured as a combination strain force that is determined by alternating strain forces from one side to another side of the rope.

5. The stress and strain gauge of claim 1, wherein the strain levels comprise biting forces, tensile strains, pulling forces, magnitude of thrashing forces and force frequencies, wherein the pulling force is a simultaneous tensile pulling force.

6. The stress and strain gauge of claim 1, wherein the alert module includes at least one audible alert configured to produce differing sounds incrementally in real-time based on the current determined animal play level.

7. The stress and strain gauge of claim 1, further comprising a communications module coupled to the stress and strain gauge indicator configured to wirelessly transmit the current animal play level to a remote computer.

8. A stress and strain gauge analyzer, comprising:
   at least one stress and strain sensor module configured to sense stresses and strains being applied by an animal biting an extension device extending from a protective hand guard;
   a stress and strain gauge indicator coupled to the at least one stress and strain sensor configured for dynamically measuring values of the sensed stresses and strains;
   a processor coupled to the stress and strain gauge indicator configured to dynamically analyze and compare the dynamically measured values to predetermined threshold measurement values to determine a current animal play level that varies incrementally; and
   an alert mobile application operating on a smart phone wirelessly coupled to the processor and configured to notify a user of the protective hand guard in real-time of the current incremental animal play level.

9. The stress and strain gauge analyzer of claim 8, wherein the at least one stress sensor module is coupled to an integrated sensor module compartment inside the protective hand guard.

10. The stress and strain gauge analyzer of claim 8, further comprising a digital memory device configured for storing the predetermined threshold measurement values.

11. The stress and strain gauge analyzer of claim 8, wherein the alert mobile application includes a plurality of audible alerts of the current incremental play level.

12. The stress and strain gauge analyzer of claim 8, wherein the dynamically measured values include strain levels comprise biting forces, tensile strains, pulling forces, magnitude of thrashing forces and force frequencies, wherein the pulling force is a simultaneous tensile pulling force.

13. The stress and strain gauge analyzer of claim 8, wherein the alert mobile application includes graphic and numeric displays of the real-time current incremental animal play level on the user mobile application.

14. The stress and strain gauge analyzer of claim 8, wherein the protective hand guard includes an illuminator with a series of light emitting diode (LED) lights coupled to the alert mobile application and configured to illuminate the LED lights incrementally in real-time based on the current incremental animal play level.

15. A stress and strain gauge processor, comprising:
   at least one stress and strain sensor module configured to sense stresses and strains being applied by a dog biting a rope extending from a protective hand guard;
   a stress and strain gauge indicator coupled to the at least one stress and strain sensor configured for dynamically measuring values of the sensed stresses and strains in real-time;
   a processor coupled to the stress and strain gauge indicator configured to automatically and dynamically analyze and compare in real-time the dynamically measured values to predetermined threshold measurement values to produce a current dog play level having varying levels of play classification; and
   an alert mobile application operating on a smart phone wirelessly coupled to the processor and configured to notify a user of the protective hand guard in real-time of the current varying levels of play classification.

16. The stress and strain gauge processor of claim 15, further comprising a digital memory device configured for storing the predetermined threshold measurement values.

17. The stress and strain gauge processor of claim 15, wherein the alert mobile application displays a graphic and numeric value in real-time of the current varying level of play classification.

18. The stress and strain gauge processor of claim 15, further comprising a computer controlled stress and strain gauge sensor with an AR/VR application for presenting a user with virtual lessons and teachings of stress and strain gauge sensor analytics.

19. The stress and strain gauge processor of claim 15, wherein the protective hand guard includes an illuminator with a series of light emitting diode (LED) lights coupled to the alert mobile application and configured to illuminate the LED lights incrementally in real-time based on the current varying levels of play classification.

20. The stress and strain gauge processor of claim 15, wherein the alert mobile application includes a plurality of audible alerts of the current varying level of play classification in real-time.

\* \* \* \* \*